(12) United States Patent
Suzuki (10) Patent No.: US 7,670,411 B2
(45) Date of Patent: Mar. 2, 2010

(54) AIR-CLEANER

(75) Inventor: Hayato Suzuki, Hamamatsu (JP)

(73) Assignee: Toyo Roki Seizo Kabushiki Kaisha, Hamamatsu-Shi (JP)

( * ) Notice: Subject to any disclaimer, the term of this patent is extended or adjusted under 35 U.S.C. 154(b) by 278 days.

(21) Appl. No.: 11/878,208

(22) Filed: Jul. 23, 2007

(65) Prior Publication Data
US 2008/0168902 A1 Jul. 17, 2008

(30) Foreign Application Priority Data
Jul. 24, 2006 (JP) ............................. 2006-200739

(51) Int. Cl.
*B01D 53/02* (2006.01)
(52) U.S. Cl. ............... 96/134; 96/109; 96/131; 95/146; 123/518; 55/309; 55/385.3
(58) Field of Classification Search ............ 96/109, 96/131, 134; 95/146; 123/518; 55/309, 55/385.3
See application file for complete search history.

(56) References Cited

U.S. PATENT DOCUMENTS

| | | | | |
|---|---|---|---|---|
| 6,383,268 B2 * | 5/2002 | Oda | ............................. | 96/134 |
| 6,432,179 B1 * | 8/2002 | Lobovsky et al. | ............. | 96/296 |
| 6,692,555 B2 * | 2/2004 | Oda et al. | ...................... | 96/134 |
| 7,163,574 B2 * | 1/2007 | Bause et al. | .................... | 96/134 |
| 7,182,802 B2 * | 2/2007 | Bause et al. | .................... | 95/146 |
| 7,213,581 B2 * | 5/2007 | Burke et al. | ................. | 123/516 |
| 7,507,279 B2 * | 3/2009 | Mizutani et al. | ............... | 96/135 |
| 7,608,137 B2 * | 10/2009 | Oda | ............................. | 96/134 |
| 2001/0013274 A1 * | 8/2001 | Oda | ............................. | 96/134 |
| 2002/0124733 A1 * | 9/2002 | Iriyama et al. | ................. | 96/134 |
| 2004/0083894 A1 * | 5/2004 | Koyama et al. | ................ | 96/133 |
| 2004/0182240 A1 * | 9/2004 | Bause et al. | .................... | 95/146 |
| 2004/0211320 A1 * | 10/2004 | Cain | ............................ | 96/108 |
| 2005/0000362 A1 * | 1/2005 | Bause et al. | .................... | 96/134 |
| 2006/0150956 A1 * | 7/2006 | Burke et al. | ................. | 123/518 |

FOREIGN PATENT DOCUMENTS

JP        2002-155815         5/2002

* cited by examiner

*Primary Examiner*—Duane Smith
*Assistant Examiner*—Christopher P Jones
(74) *Attorney, Agent, or Firm*—Young & Thompson (57) ABSTRACT

An air-cleaner includes a housing attached to an induction system of an internal combustion engine. The air-cleaner includes a filter element located within the housing and separating the internal of the housing into a dust side and clean side, the dust side having an introduction portion for introducing an external air into the housing, the clean side having a feeder portion for feeding a filtered air to an engine. The air-cleaner includes a plate-shaped adsorption element including an adsorbent to adsorb a vaporized fuel returned from an engine side and permitting an air to pass therethrough, the adsorption element arranged to cross the direction of an air flow and fitted to occupy the entire surface of the clean side in the housing. The adsorption element defines a port connecting the filter element and the feeder portion, and includes a valve disc to open or close the port. The valve disc is controlled to open during air inspiration for permitting an air to flow toward the feeder portion. The valve disc includes an adsorbent, and permits an air to pass therethrough.

5 Claims, 7 Drawing Sheets

AIR-CLEANER

CROSS-REFERENCE TO RELATED APPLICATIONS

This application is based upon and claims the benefit of priority from Japanese Patent Application No. 2006-200739 filed on Jul. 24, 2006; the entire contents of which are incorporated herein by reference.

BACKGROUND OF THE INVENTION

The invention relates to an air-cleaner including an adsorption element to adsorb a vaporized fuel returned from the engine side to the induction system.

An internal combustion engine has an induction system to produce the following phenomenon. A vaporized fuel leaked from an injector, a vapor flowing back from the purge circuit of a canister, a refluxed blow-by gas and the like during stopping the engine are returned from the engine side to the induction system. Therefore, the technical field of internal combustion engines has conventionally taken various measures to prevent the returned vaporized fuel from being discharged into the atmosphere to pollute the air.

In recent years, there has been proposed an induction system including adsorption means containing an adsorbent and adsorbing a vaporized fuel in the induction system. The invention disclosed in Japanese Patent Application Laid-open No. 2002-155815 is one example of the above technique.

An air-cleaner disclosed in Japanese Patent Application Laid-Open No. 2002-155815 adsorbs the vaporized fuel inside the air-cleaner. The air-cleaner includes a housing and a filter element. The filter element is arranged to separate the interior of the air-cleaner into a dust side and a clean side. The dust side has an introduction portion for introducing the air. The clean side has a feeder portion for feeding filtered air to an engine. The air-cleaner also includes, on the clean side of the filter element, a plate-shaped adsorption element containing an adsorbent. The adsorption element is arranged parallel to the filter element on the clean side in the housing. The adsorption element is arranged to cover up the entire cross-section of the housing. Furthermore, the air-cleaner includes a variable vane on the clean side to adjust a circulation region of the air circulating in the housing.

According to the invention disclosed in Japanese Patent Application Laid-Open No. 2002-155815, the adsorption element certainly covers up the entire cross-section of the housing in the housing of the air-cleaner. The disclosed structure prevents the vaporized fuel returned from the engine side from flowing out into the air side relative to the air-cleaner.

This structure, however, causes air to necessarily pass through the adsorption element during air inspiration, and the adsorption element increases a passage resistance of the air.

SUMMARY OF THE INVENTION

The invention is directed to provide an air-cleaner that securely captures a vaporized fuel without increasing a passage resistance of the air.

The first aspect of the invention provides the following air-cleaner. The air-cleaner includes a housing attached to an induction system of an internal combustion engine. The air-cleaner includes a filter element located within the housing and separating the internal of the housing into a dust side and clean side, the dust side having an introduction portion for introducing an external air into the housing, the clean side having a feeder portion for feeding a filtered air to an engine. The air-cleaner includes a plate-shaped adsorption element including an adsorbent to adsorb a vaporized fuel returned from an engine side and permitting an air to pass therethrough, the adsorption element arranged to cross the direction of an air flow and fitted to occupy the entire surface of the clean side in the housing. The adsorption element defines a port connecting the filter element and the feeder portion, and includes a valve disc to open or close the port. The valve disc is controlled to open during air inspiration for permitting an air to flow toward the feeder portion. The valve disc includes an adsorbent, and permits an air to pass therethrough.

The second aspect of the invention provides the following air-cleaner. The air-cleaner includes a housing attached to an induction system of an internal combustion engine. The air-cleaner includes a filter element located within the housing and separating the internal of the housing into a dust side and clean side, the dust side having an introduction portion for introducing an external air into the housing, the clean side having a feeder portion for feeding a filtered air to an engine. The air-cleaner includes a plate-shaped adsorption element including an adsorbent to adsorb a vaporized fuel returned from an engine side and permitting an air to pass therethrough, the adsorption element arranged to cross the direction of an air flow and fitted to occupy the entire surface of the clean side in the housing. The adsorption element includes an adsorbent having a honeycomb arrangement having a communication passage connecting the right and back sides of the adsorption element.

The valve disc may be movable to open or close the port. The valve may be movable upward to open the port under a pressure during passing of an inspired air passes through the port. The valve disc may be movable downward by the own weight to close the port.

The adsorption element may include an actuator for moving the valve disc to force the port to open or close. The adsorption element may include a controller for operating the actuator to open or close the port in response to a signal from a state sensor to detect the induction system to be in an aspiration state or a resting state. The controller may respond to the signal from the state sensor to operate the actuator for permitting the valve disc to open the port when the controller determines the induction system to be in an aspiration state and for permitting the valve disc to close the port when the controller determines the induction system to be in a resting state.

The port may be positioned to a region having the highest circulation density of an air flow in the housing.

The feeder portion may include an auxiliary adsorbent for adsorbing a vaporized fuel returned from the engine side. The auxiliary adsorbent may have a honeycomb arrangement having a communication passage connecting the opposed surfaces with each other. The auxiliary adsorbent may cover the entire surface of the feeder portion. The communication passage may connect an air-cleaner side and the engine side to each other.

DETAILED DESCRIPTION OF THE PREFERRED EMBODIMENTS

Embodiments of the invention will be described below with reference to the accompanying drawings.

Figure 2:
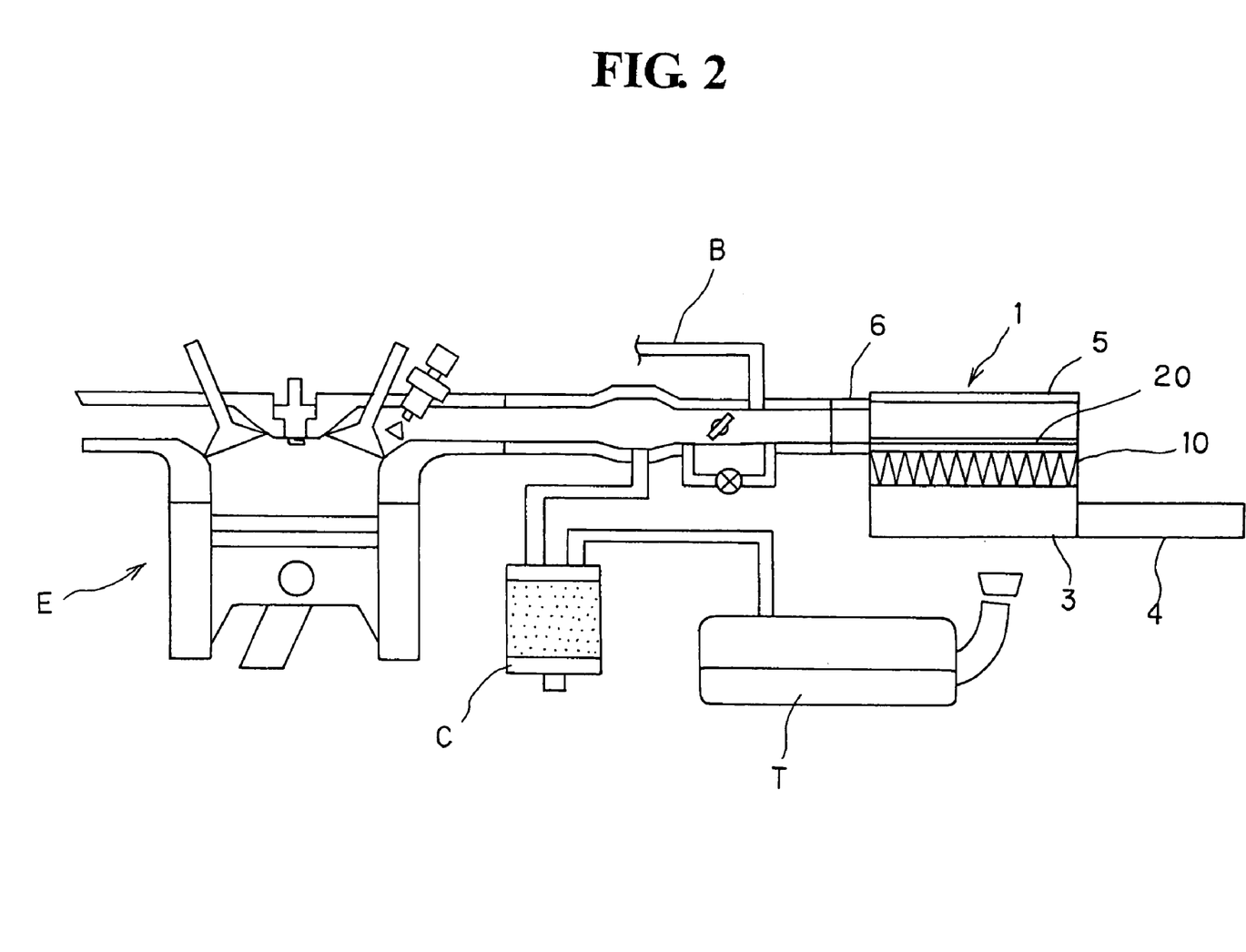
FIG. 2 is a schematic diagram of the induction system of an internal combustion engine that employs the air-cleaner shown in FIG. 1.

As shown in FIG. 2, an air-cleaner 1 is attached on the induction system of the engine E of a vehicle. The air-cleaner 1 filters intake external air and feeds the filtered air to the engine E. The induction system includes, on a path between the air-cleaner 1 and the engine E, a purge circuit of a canister C connected to a fuel tank T via the canister C, and a blow-by passage B. The purge circuit communicates with the blow-by passage B.

In the induction system configured as stated above, during stopping the engine E, a vaporized fuel is leaked from an injector to flow from the purge circuit of the canister C on an engine E side relative to the air-cleaner 1. The vaporized fuel that is not adsorbed only by the canister C and refluxed blow-by gas are filled up in the induction system. The vaporized fuel and the blow-by gas are returned to the upstream side of the induction system.

Figure 1:
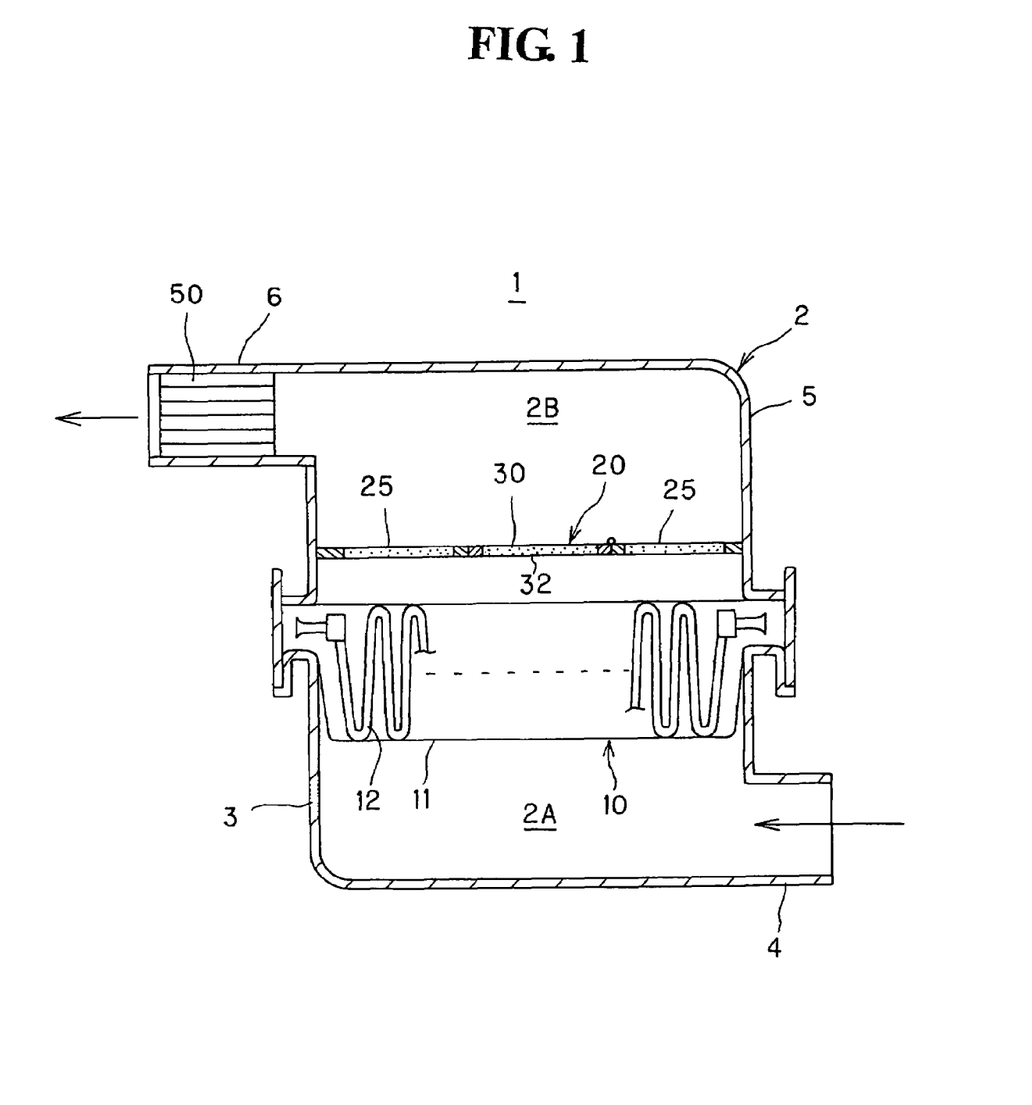
FIG. 1 is a longitudinal sectional view illustrating the internal structure of an air-cleaner according to an embodiment of the invention.

The air-cleaner 1 shown in FIG. 1 adsorbs the vaporized fuel returned from the engine E side and effectively prevents the vaporized fuel from being discharged into the atmosphere. The engine E side includes, for example, the engine E, the canister C located between the engine E and the air-cleaner 1, and the blow-by passage B. The air-cleaner 1 shown in FIG. 1 includes a housing 2 serving as the outer envelope of the air-cleaner 1. The air-cleaner 1 also includes a filter element 10 arranged in the housing 2. The air-cleaner 1 further includes an adsorption element 20 adsorbing the vaporized fuel returned from the engine E side.

The housing 2 includes a casing 3 having an open upper portion. The housing 2 also includes a cover 5 having an open lower portion. The casing 3 includes an introduction portion 4 for introducing an external air into the housing 2. The cover 5 includes a feeder portion 6 for feeding the air filtered by the air-cleaner 1 toward the engine E. The introduction portion 4 protrudes outward from one of four side surfaces of the casing 3. Likewise, the feeder portion 6 protrudes outward from one of four side surfaces of the cover 5. The casing 3 and the cover 5 are assembled with each other so that the open upper portion of the casing 3 is fitted on the open lower portion of the cover 5 to mutually close the open portions. During this assembly, the introduction portion 4 included in the casing 3 and the feeder portion 6 included in the cover 5 are positioned to regions opposed each other.

The air-cleaner 1 includes the filter element 10 arranged therein. The filter element 10 included in the air-cleaner 1 filters the external air introduced from the introduction portion 4 into the air-cleaner 1. The filter element 10 includes a filtering member 12 folded into continuous ridges and troughs. The filer element 10 also includes a holding frame 11 arranged around the filtering member 12 for holding the filtering member 12. The holding frame 11 is arranged in the housing 2, with it held between the casing 3 and the cover 5. Therefore, the filter element 10 separates the interior of the housing 2 into a dust side 2A corresponding to a casing 3 side including the introduction portion 4 and a clean side 2B corresponding to a cover 5 side including the feeder portion 6. The dust side 2A provides a region closer to the casing 3 relative to the filter element 10, and includes the air before passing through the filter element 10. The clean side 2B provides a region closer to the cover 5 relative to the filter element 10, and includes the air after passing through the filter element 10.

Figure 3:
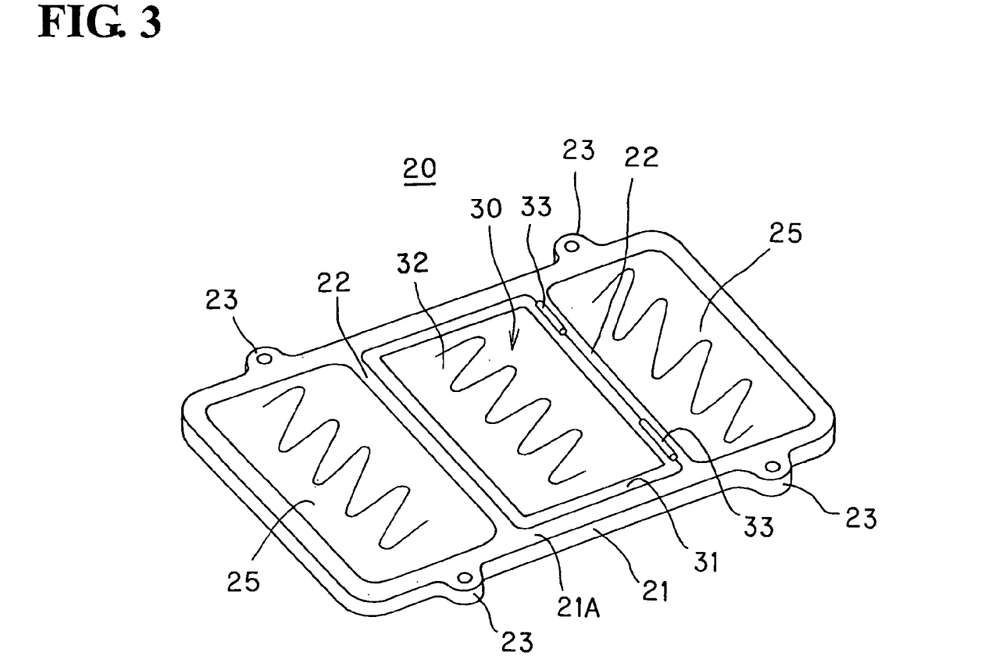
FIG. 3 is a perspective view of the adsorption element employed in the air-cleaner shown in FIG. 1.
Figure 4:
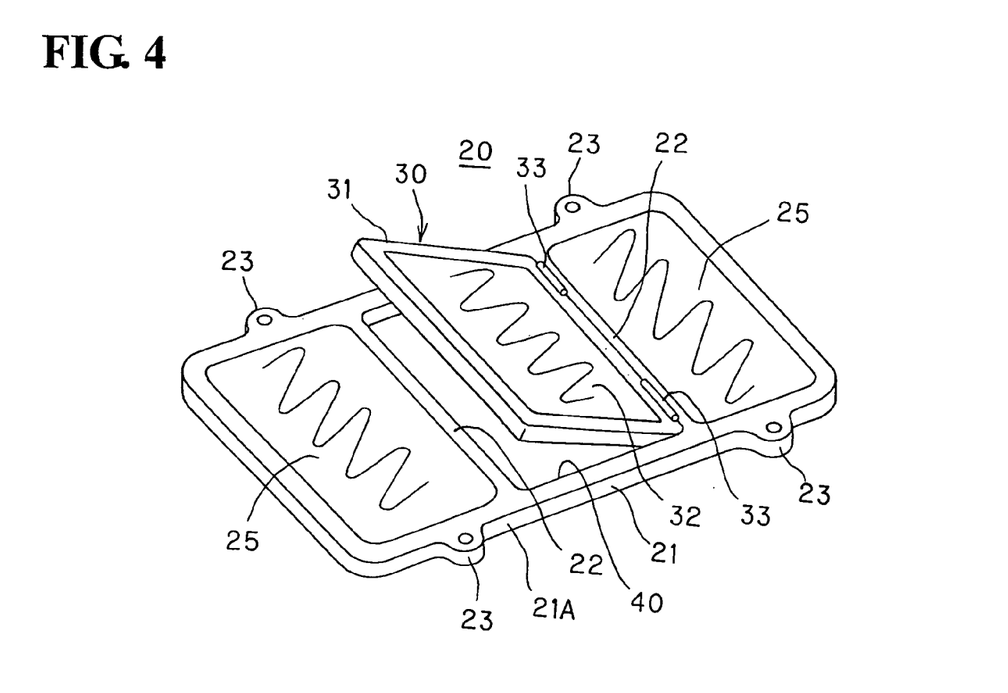
FIG. 4 is a perspective view of the adsorption element shown in FIG. 3 with the valve disc moved to open a port.

The air-cleaner 1 includes the adsorption element 20 attached to the interior of the housing 2. The adsorption element 20 adsorbs the vaporized fuel returned from the engine E side. With reference to FIGS. 3 and 4, the adsorption element 20 will be described.

The adsorption element 20 is shaped as a plate. The adsorption element 20 includes a holding frame 21 that is the peripheral edge of the adsorption element 20. The adsorption element 20 includes adsorption portions 25 held by the holding frame 21. The adsorption frame 21 includes a frame portion 21A of a rectangular shape. The adsorption frame 21 includes two ribs 22 extending in a short-axis direction of the frame portion 21A so as to separate the adsorption element 20 into three regions in a long-axis direction. The frame portion 21A includes two regions extending in the long-axis direction. Each of the two regions includes two attachment portions 23 protruding outward at two axial positions, respectively.

Among the three separate regions, two regions on both sides of the adsorption element 20 include flat adsorption portions 25 held by the holding frame 21, respectively. Each of these adsorption portions 25 is structured, for example, so that an adsorbent such as activated carbon is wrapped up in a wrapping member such as a nonwoven cloth. The central region among the three separate regions includes a port 40 formed to permit the air to flow in a thickness direction of the adsorption element 20. The port 40 is an opening portion surrounded by the two regions extending in the long-axis direction of the frame portion 21A and the two ribs 22. The adsorption element 20 includes a valve disc 30 opening or closing the port 40. The valve disc 30 is formed in a rectangular shape to be fitted inside of the port 40. The valve disc 30 includes a frame 31 constituting the periphery of the valve disc 30 and an adsorption portion 32 arranged inside of the frame 31. The adsorption portion 32 of the valve disc 30 is structured, for example, so that an adsorbent such as activated carbon is wrapped up in a wrapping member such as a non-woven cloth, and is formed as a plate.

One side of the frame 31 that is the peripheral edge of the valve disc 30 is linked to one of the ribs 22 of the holding frame 21 using a hinge 33. The valve disc 30 is rotatable about the hinge 33 relative to the holding frame 21. The valve disc 30 rotates around the hinge 33 to open or close the port 40. FIG. 3 illustrates a structure where the valve disc 30 closes the port 40. FIG. 4 illustrates a structure where the valve 30 rotates around the hinge 33 and moves upward to open the port 40. The valve disc 30 according to the embodiment is forced to move upward under a pressure of the air to open the port 40 when the air circulates from bottom up as shown in FIGS. 3 and 4. On the other hand, after the flow of the air is stopped, the open valve disc 30 is moved downward by its own weight, thereby closing the port 40.

As shown in FIG. 1, the adsorption element 20 is attached to the interior of the cover 5 in parallel to the filter element 10 within the cover 5 that is the clean side 2B. Therefore, the cross-sectional interior of the cover 5 is entirely covered with the adsorption element 20, and the adsorption element 20 occupies the entire cross-section of the cover 5 in a direction crossing the air. The adsorption element 20 is attached so that the valve disc 30 is open in an upward direction that is a direction of the engine E side. The adsorption element 20 is attached so that a hinge 33 side of the adsorption element 20 is arranged on an introduction port 4 side and so that the end side thereof is arranged on a feeder potion 6 side.

A structure and a method for attachment are not limited to specific ones. For example, attachment brackets may be provided on the inside surface of the cover 5. The attachment portions 23 formed at the holding frame 21 of the adsorption element 20 are screwed with the attachment brackets or secured with rivets, thereby attaching the adsorption element 20 into the cover 5. Alternatively, the adsorption element 20 may be attached in the cover 5 by welding the holding frame 21 of the adsorption element 20 to the inside surface of the cover 5. The attachment structure and method may be appropriately selected according to regulatory restrictions as to whether the adsorption element 20 is configured to be detachably attached to the cover 5 or to non-detachably attached thereto, or according to situations of the air-cleaner 1 itself such as an internal shape of the cover 5.

Figure 5:
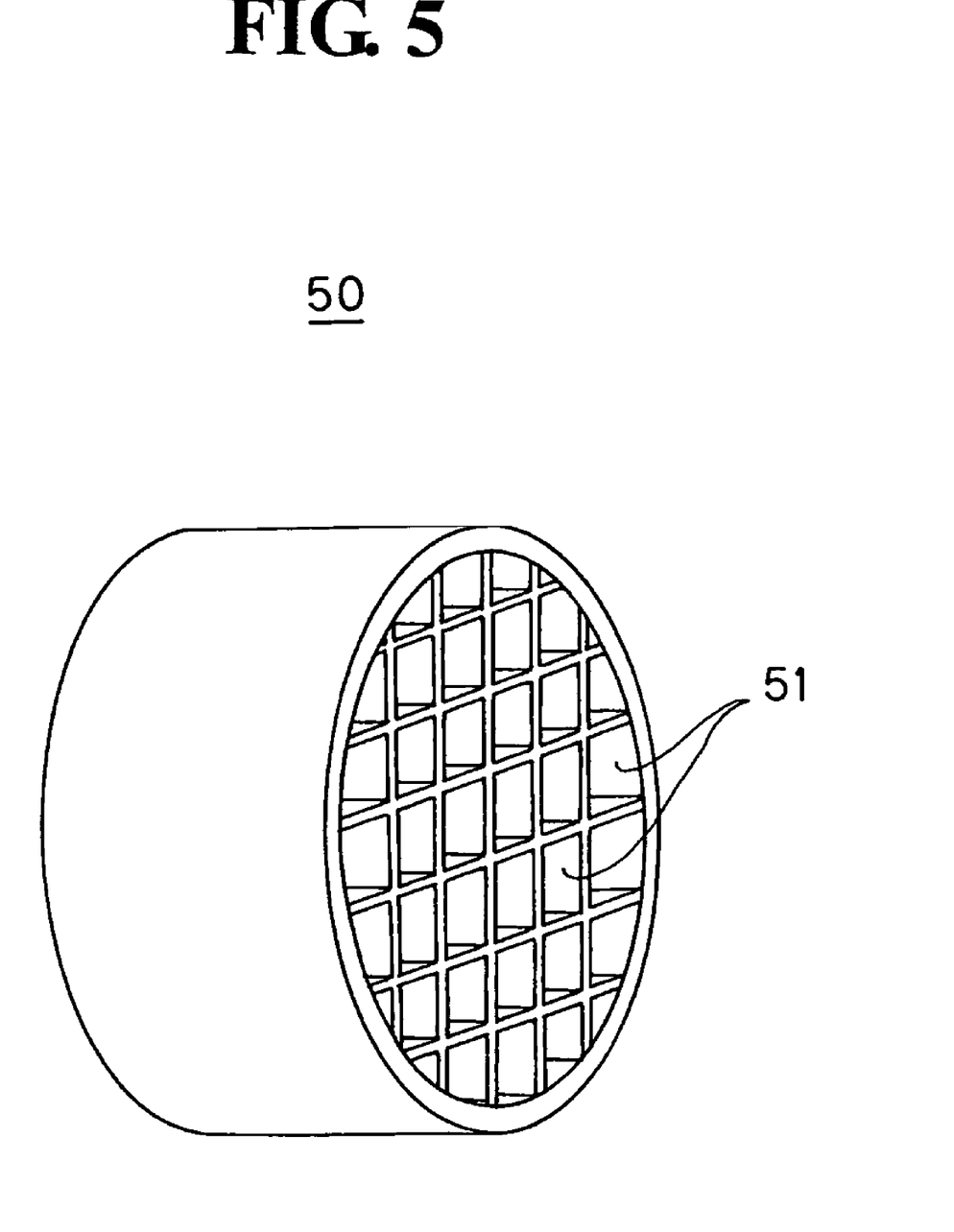
FIG. 5 is a perspective view of an adsorbent having a honeycomb structure and attached to a feeder potion.

Moreover, the air-cleaner 1 includes an auxiliary adsorbent 50 attached to the feeder portion 6 protruding outward from the cover 5 separately from the adsorption element 20. As shown in FIG. 5, the auxiliary adsorbent 50 is formed in a cylindrical shape. The auxiliary adsorbent 50 has a honeycomb structure including a plurality of communication passages 51 connecting the axially opposed surfaces of the auxiliary adsorbent 50. The communication passages 51 adsorb the vaporized fuel per se when the vaporized fuel passes through the communication passages 51 of the auxiliary adsorbent 50.

The auxiliary adsorbent 50 of the honeycomb structure is structured so that a wood-based adsorbent and a ceramic adhere to a base material. As the base material, a material formed to have the honeycomb structure in advance may be used. Alternatively, the wood-based 42 adsorbent and the ceramic may be mixed up and the mixture may be formed into the honeycomb structure. The auxiliary adsorbent 50 is coated with a rubber so as to improve vibration resistance.

The air-cleaner 1 configured as stated above in an inspiration state of the induction system when and after the engine E is started functions differently from that in a resting state of the induction system when and after the engine E is stopped. The adsorption element 20 functions as follows in the inspiration state and the resting state, respectively.

Figure 6:
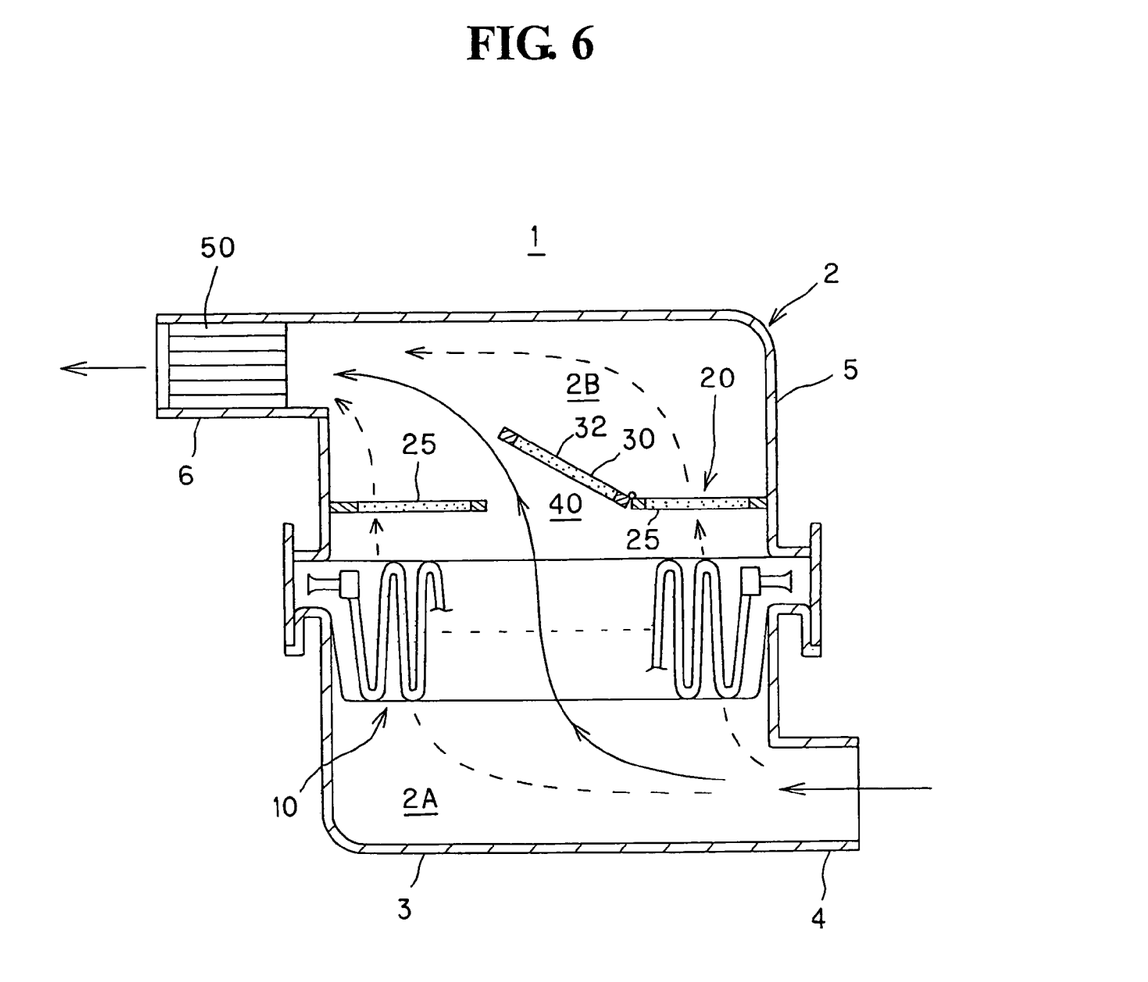
FIG. 6 is a longitudinal sectional view of the air-cleaner shown in FIG. 1 with the port opened.

First, the function of the adsorption element 20 in the inspiration state will be described with reference to FIG. 6. If the induction system is in the inspiration state, the external air is introduced into the air-cleaner 1 from the introduction portion 4. The introduced air circulates in the housing 2, passes through the filer element 10, and moves from the housing 2 on the lower side to the cover 5 on the upper side. The filter element 10 filters various impurities contained in the air when the air passes through the filtering member 12 of the filter element 10. The air passing through the filter element 10 forces the valve disc 30 provided on the adsorption element 20 upward under a pressure of the air, thereby opening the port 40. As a result, the air passes through the adsorption element 20 via the opened port 40. In this manner, the air is permitted to flow from the opened port 40 to the engine E side.

Accordingly, the adsorption element 20 minimizes an increase in the passage resistance of the air within the air-cleaner 1. The valve disc 30 is permitted to move downstream of the flow of the air, and the hinge 33 is positioned to the introduction portion 4 side. Therefore, the valve disc 30 is not an obstacle to the flow of the air, i.e., does not disturb the flow of the air. The air passing through the port 40 smoothly circulates toward the feeder portion 6.

Meanwhile, when the engine E is stopped, the induction system turns into the resting state. At this time, the valve disc 30 that has been moved upward by the air moves downward by its own weight, thereby closing the port 40. It is to be noted that the state shown in FIG. 1 corresponds to the state of the adsorption element 20 in the resting state.

With the engine E stopped, the engine E side relative to the air-cleaner 1 is filled with the vaporized fuel, the refluxed blow-by gas and the like, and the vaporized fuel, the refluxed blow-by gas and the like are returned to the upstream side of the induction system. The vaporized fuel is one leaked from the injector or flowing out from the purge circuit of the canister C. The returned vaporized fuel passes first through the communication passages 51 of the auxiliary adsorbent 50, and is adsorbed by the auxiliary adsorbent 50. However, only the auxiliary adsorbent 50 cannot entirely adsorb the vaporized fuel. The vaporized fuel passing through the communication passages 51 enters into the housing 2. The vaporized fuel entering into the housing 2 is adsorbed by the adsorption element 20.

In the resting state, the port 40 of the adsorption element 20 is closed by the valve disc 30. The entire surface of the interior of the cover 5 as the clean side 2B is covered with the adsorption element 20. Therefore, when the vaporized fuel is returned from the engine E side and enters into the housing 2, the adsorption element 20 prevents the vaporized fuel from moving upstream of the adsorption element 20. The adsorption element 20 includes not only the adsorption portions 25 arranged on the both sides of the adsorption element 20 in the long-axis direction but also the adsorption portion 32 arranged in the valve disc 30 that closes the port 40. Such a structure of the adsorption element 20 is permitted to enlarge an area of contacting the vaporized fuel, as compared with a structure having the valve disc 30 without the adsorption portion 32. This structure improves the efficiency of adsorption.

Referring again to FIG. 6, to which location of the adsorption element 20 the port 40 formed in the adsorption element 20 is to be positioned will be described.

The air is introduced into the housing 2 from the introduction portion 4. In this case, even if the adsorption element 20 is not provided in the housing 2, the distribution of the air flowing in the same plane within the housing 2 is not uniform. The air-flow is separated into a region with a high flow density of air and a region with a low flow density of air. For example, the air flows into a central region of a space within the housing 2 of the air-cleaner 1 shown in FIG. 6 with a high flow density, as indicated by a solid line. On the other hand, a region on the introduction portion 4 side and a region on the feeder portion 6 side do not have the smooth flow of the air as indicated by a broken line, and the flow density of the air is lower. Considering these respects, if the port 40 of the adsorption element 20 is arranged to coincide with the region with the high flow density of the air, the smooth flow of the air is not disturbed. In the air-cleaner 1 according to the embodiment, the air flows with a high flow density at the center of the housing 2. Therefore, the adsorption element 20 includes the port 40 in the central portion of the adsorption element 20 so as to coincide with the position of the center of the housing 2.

Needless to say, the distribution of the flow densities of the air in the housing 2 depend on the shape of the housing 2 and the positions at which the introduction portion 4 and the feeder portion 6 are provided, respectively. It is, therefore, necessary to arrange the port 40 to correspond to the air-cleaner to be employed in the induction system.

In the adsorption element 20 in this embodiment, the air can pass through the adsorption portions 25 and 32. Therefore, even if the port 40 remains closed due to a malfunction of the valve disc 30, the air passes through the adsorption portions 25 and 32 to be fed to the engine E side. Such a function of the adsorption element 20 prevents damages of the entire induction system or the engine E itself. Conversely, if the hinge 33 malfunctions for some reason, the port 40 may possibly be unable to move downward by its own weight and remain opened. For eliminating this trouble, a spring or the like may be provided in the adsorption element 20 to urge the valve disc 30 to always close the port 40. In this case, an urging force of the spring is set higher than the pressure of the air passing through the port 40 so that the valve disc 30 can be moved under the pressure of the air to open the port 40.

The movement of the valve disc 30 has been described so far, while taking the instance of controlling the movement of the valve disc 30 by the pressure of the air flowing in the air-cleaner 1 as an example. However, the invention is not limited to the instance, and the valve disc 30 may be forced to move so as to open or close the port 40.

Figure 7:
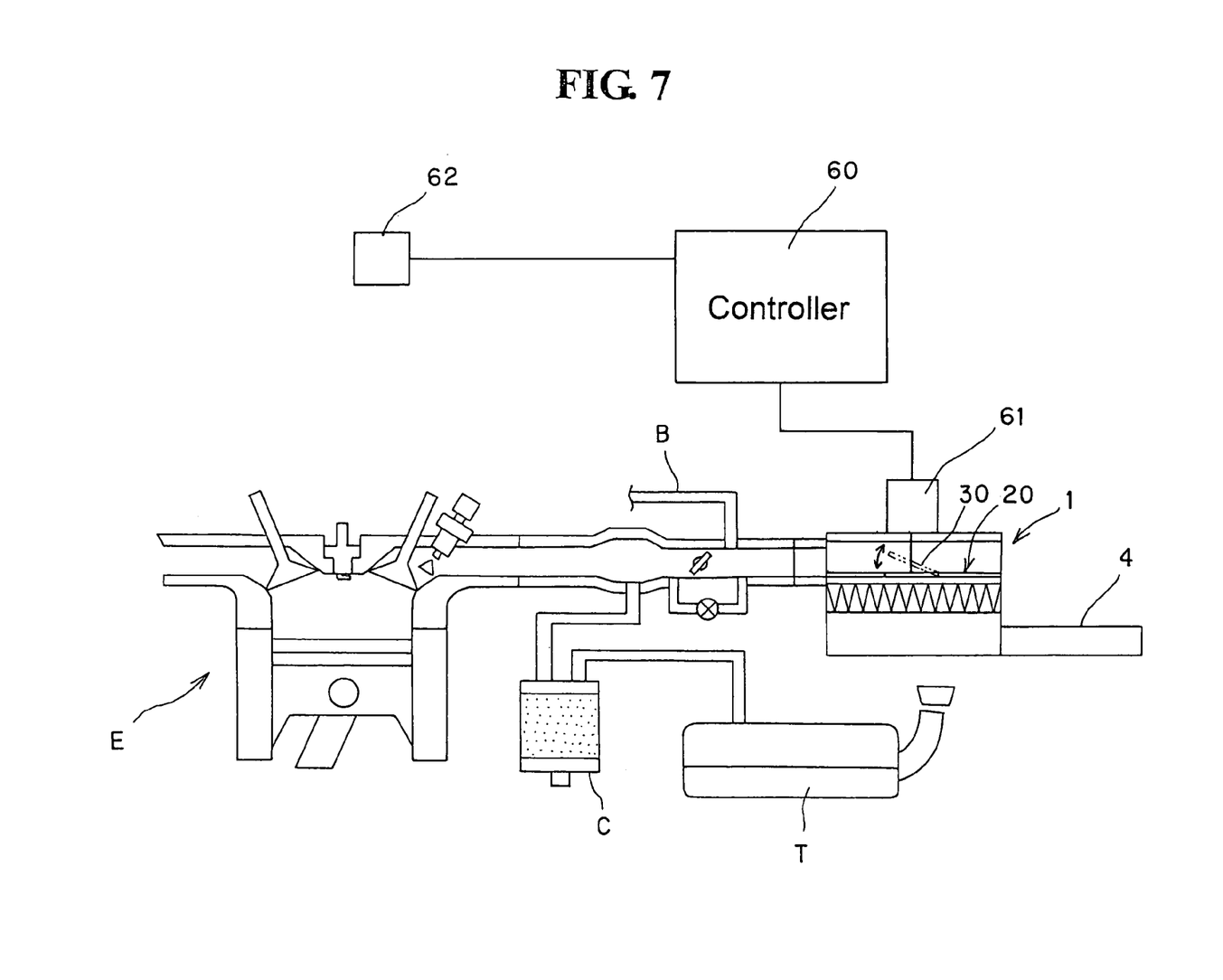
FIG. 7 is a schematic diagram of an induction system if a valve disc is forced to move for opening or closing the port.

FIG. 7 is a schematic diagram of an induction system if a valve disc is forced to move for opening or closing a port 40 according to another embodiment of the invention. The induction system shown in FIG. 7 includes a state sensor 62 that detects whether the induction system is in an inspiration state or in a resting state. The induction system includes open-close means 61 serving as an actuator such as an air cylinder or a motor. If the controller 60 transmits a command to the open-close means 61, the valve disc 30 is forced to move. For example, if a user turns on a start switch for starting an engine E and the engine E starts, the state sensor 62 detects a state of the start switch so as to move the valve disc 30 to open the port 40. The state sensor 62 controls the controller 60 to transmit the command to the open-close means 61, based on a signal from the start switch. Alternatively, a pressure sensor may be arranged upstream of the air-cleaner 1 in the induction system in place of the state sensor 62. In this alternative, when the engine E starts, the induction system is permitted to turn into the inspiration state. When a pressure of the induction system changes, the pressure sensor detects the pressure change. The controller 60 controls the open-close means 61 to operate based on a signal from the pressure sensor so as to move the valve disc 30. In this manner, the port 40 may be opened or closed by forcedly moving the valve disc 30.

The air-cleaner 1 according to the embodiment includes both the adsorption element 20 and the auxiliary absorbent 50 of the honeycomb structure. Embodiments of the invention are not limited to the ones described above. Alternatively, the air-cleaner 1 may be configured to include only one of the adsorption element 20 and the auxiliary absorbent 50.

Figure 8:
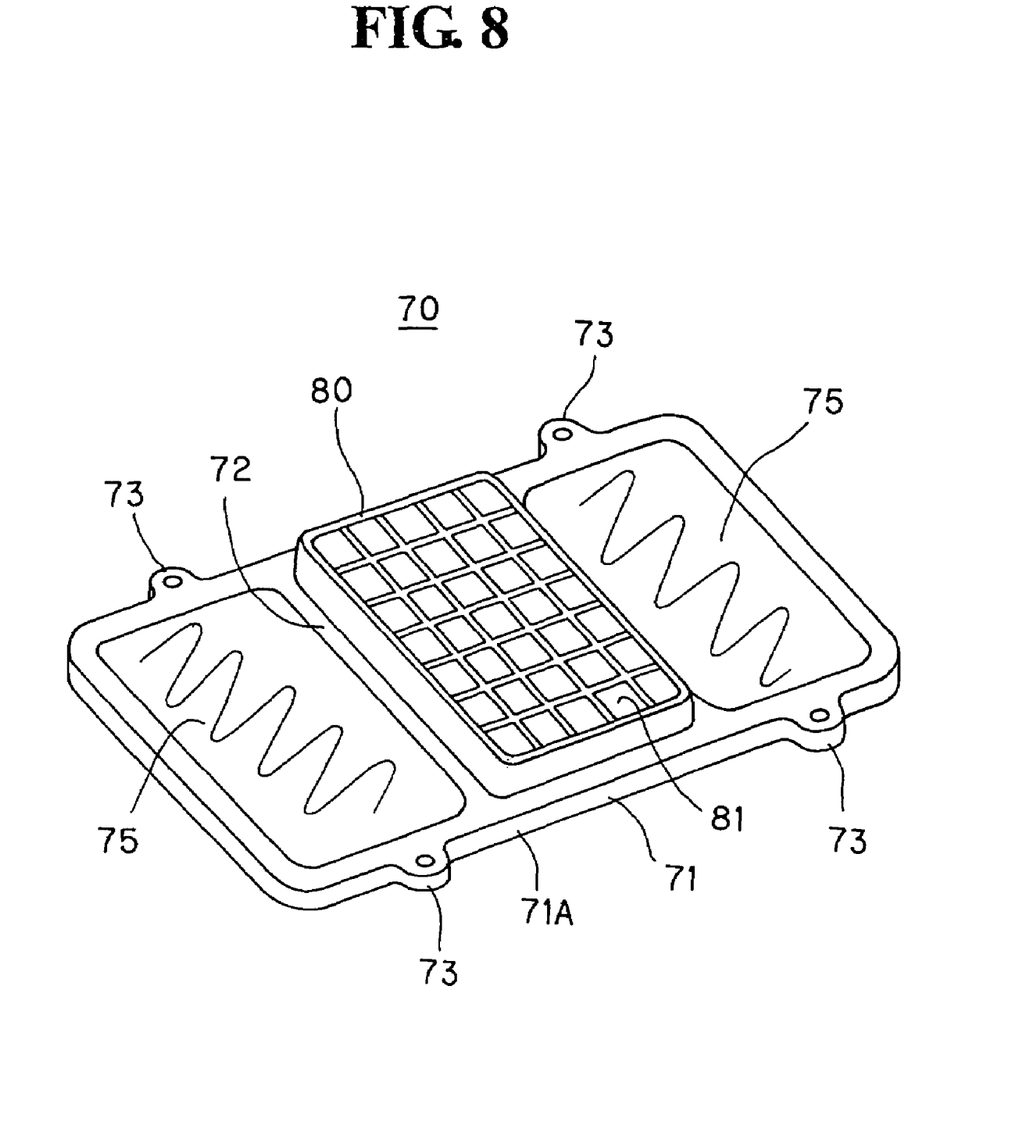
FIG. 8 is a perspective view of an adsorption element different from the adsorption element shown in FIGS. 3 and 4 and employed in an air-cleaner according to another embodiment of the invention.

Furthermore, the air-cleaner 1 may include an adsorption element 70 shown in FIG. 8.

The adsorption element 70 includes a holding frame 71 and adsorption portions 75 held by the holding frame 71. The adsorption frame 71 includes a frame portion 71A of a rectangular shape. The adsorption frame 71 includes two ribs 72 extending in a short-axis direction so as to separate the adsorption element 70 into three regions in a long-axis direction. The adsorption frame 71 includes two regions extending in the long-axis direction, in the frame 71A. Each of the two regions includes two attachment portions 73 protruding outward at two axial positions, respectively.

Among the three separate regions, two regions on both sides of the adsorption element 70 include flat adsorption portions 75 held by the holding frame 71, respectively. These adsorption portions 75 are similar to the adsorption portions 25 of the adsorption element 20 shown in FIGS. 3 and 4. On the other hand, the central region among the three separate regions includes an absorbent 80 fitted thereinto. The absorbent 80 is formed to have an external shape of a rectangular parallelepiped. The absorbent 80 has a honeycomb structure including a plurality of communication passages 81 connecting axially opposed surfaces of upper and lower ends of the adsorbent 80. The adsorbent 80 of the honeycomb structure is structured so that a wood-based adsorbent and ceramic adhere to a base material. Alternatively, the wood-based adsorbent and the ceramic may be mixed up and the mixture may be formed into the honeycomb structure. The adsorbent 80 may be preferably coated with a rubber so as to improve vibration resistance similarly to the auxiliary absorbent 50.

In the adsorption element 70 according to still another embodiment of the invention, the air that has passed through the filter element 10 flows through communication passages 81 of the adsorbent 80 and circulates downstream. On the other hand, the vaporized fuel, returned from the engine E side to the air-cleaner 1, is adsorbed by the adsorption portions 75 on the both sides of the adsorption element 70 and by the adsorbent 80 of the honeycomb structure. The adsorbent 80 adsorbs the vaporized fuel not only on its surface but also in the respective communication passages 81 into which the vaporized fuel enters. Similarly to the adsorption element 20, the adsorption element 70 may be configured so that the adsorbent 80 is located in a region having the air to flow with the highest flow density in the housing 2.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

According to the invention, adsorption element is arranged to cross the direction of an air flow and is fitted to occupy the entire surface of the clean side in the housing. The adsorption element securely adsorbs a vaporized fuel returned from an engine side. The adsorption element defines a port, and includes a valve disc to open or close the port. The valve disc opens or closes the port for permitting an air to flow toward the engine side. The valve disc permits the port to be open during aspiration, preventing air-flow resistance of the air form increasing. During stopping the engine, the valve disc closes the port, effectively preventing the vaporized fuel from the engine side from leaking to air side relative to adsorption element.

The adsorption element includes an adsorbent for permitting an air to pass therethrough. Even if a malfunction of the valve disc is produced to close the port, the adsorption element ensures air inspiration to the engine.

The adsorption element includes an adsorbent defining a communication passage. During air aspiration, an air passes through the communication passage, preventing air-flow resistance from increasing. On the other hand, even if a vaporized fuel is returned, the adsorption element adsorbs the vaporized fuel, effectively preventing the leakage to the air side. The adsorption element with the adsorbent has the communication passage having an adsorbent attached thereto.

Therefore, if the vaporized fuel enters the passage, the passage itself adsorbs the vaporized fuel.

In addition to the adsorption element, the auxiliary adsorbent is provided on the feeding passage, further effectively adsorbing the vaporized fuel.

What is claimed is:

1. An air-cleaner comprising:
a housing attached to an induction system of an internal combustion engine;
a filter element located within the housing and separating the internal of the housing into a dust side and clean side, the dust side having an introduction portion for introducing an external air into the housing, the clean side having a feeder portion for feeding a filtered air to an engine;
a plate-shaped adsorption element including an adsorbent to adsorb a vaporized fuel returned from an engine side and permitting an air to pass therethrough, the adsorption element arranged to cross the direction of an air flow and fitted to occupy the entire surface of the clean side in the housing,
wherein the adsorption element defines a port connecting the filter element and the feeder portion, and includes a valve disc to open or close the port,
wherein the valve disc is controlled to open during air inspiration for permitting an air to flow toward the feeder portion, and
wherein the valve disc includes an adsorbent, and permits an air to pass therethrough.

2. The air-cleaner according to claim 1,
wherein the valve disc is movable to open or close the port,
wherein the valve is movable upward to open the port under a pressure during passing of an inspired air through the port, and
wherein the valve disc is movable downward by the own weight to close the port.

3. The air-cleaner according to claim 1,
wherein the adsorption element includes: an actuator for moving the valve disc to force the port to open or close; and a controller for operating the actuator to open or close the port in response to a signal from a state sensor to detect the induction system to be in an aspiration state or a resting state, and
wherein the controller responds to the signal from the state sensor to operate the actuator for permitting the valve disc to open the port when the controller determines the induction system to be in an aspiration state and for permitting the valve disc to close the port when the controller determines the induction system to be in a resting state.

4. The air-cleaner according to claim 1, wherein the port is positioned to a region having the highest circulation density of an air flow in the housing.

5. The air-cleaner according to claim 1, wherein the feeder portion includes an auxiliary adsorbent for adsorbing a vaporized fuel returned from the engine side,
wherein the auxiliary adsorbent has a honeycomb arrangement having a communication passage connecting the opposed surface with each other,
wherein the auxiliary adsorbent covers the entire surface of the feeder portion, and
wherein the communication passage connects an air-cleaner side and the engine side to each other.

* * * * *